United States Patent [19]
Bernard et al.

[11] Patent Number: 5,573,193
[45] Date of Patent: Nov. 12, 1996

[54] FISHING REEL WITH ENCLOSED SPOOL AND LINE RETAINING DEVICE

[75] Inventors: Jean Bernard, Scionzier; Alain Plestan, Marignier, both of France

[73] Assignee: Mitchell Sports, France

[21] Appl. No.: 305,031

[22] Filed: Sep. 13, 1994

[30]      Foreign Application Priority Data

Sep. 14, 1993  [FR]   France ................................ 93 11062

[51] Int. Cl.[6] .................................................. A01K 89/00
[52] U.S. Cl. .......................................... 242/319; 242/322
[58] Field of Search ..................................... 242/319, 322

[56]              References Cited

U.S. PATENT DOCUMENTS

| 2,643,828 | 3/1951 | Vincent . | |
| 2,884,211 | 4/1959 | Holahan, Jr. | 242/319 |
| 2,973,916 | 3/1961 | Shakespeare . | |
| 4,058,269 | 11/1977 | Nurmse | 242/319 |
| 4,061,288 | 12/1977 | Karlsson et al. | 242/319 |
| 4,106,718 | 8/1978 | Catignani | 242/319 X |
| 4,561,604 | 12/1985 | Matsushima | 242/319 |
| 4,778,124 | 10/1988 | Shinohara | 242/319 X |
| 4,834,311 | 5/1989 | Kaneko | 242/319 |
| 5,294,074 | 3/1994 | Henriksson | 242/319 |
| 5,318,247 | 6/1994 | Sugawara | 242/319 |

FOREIGN PATENT DOCUMENTS

| 861383 | 2/1941 | France . |
| 918571 | 2/1947 | France . |
| 1027031 | 5/1953 | France . |

*Primary Examiner*—Daniel P. Stodola
*Assistant Examiner*—William A. Rivera
*Attorney, Agent, or Firm*—Foley & Lardner

[57]                ABSTRACT

A fishing reel comprises a spool whose posterior flange carries a ring engaged in an annular peripheral groove. The ring comprises studs sliding in longitudinal grooves on the inside surface of a cylindrical peripheral wall of the flyer. The ring prevents the line getting between the spool and the flyer.

16 Claims, 3 Drawing Sheets

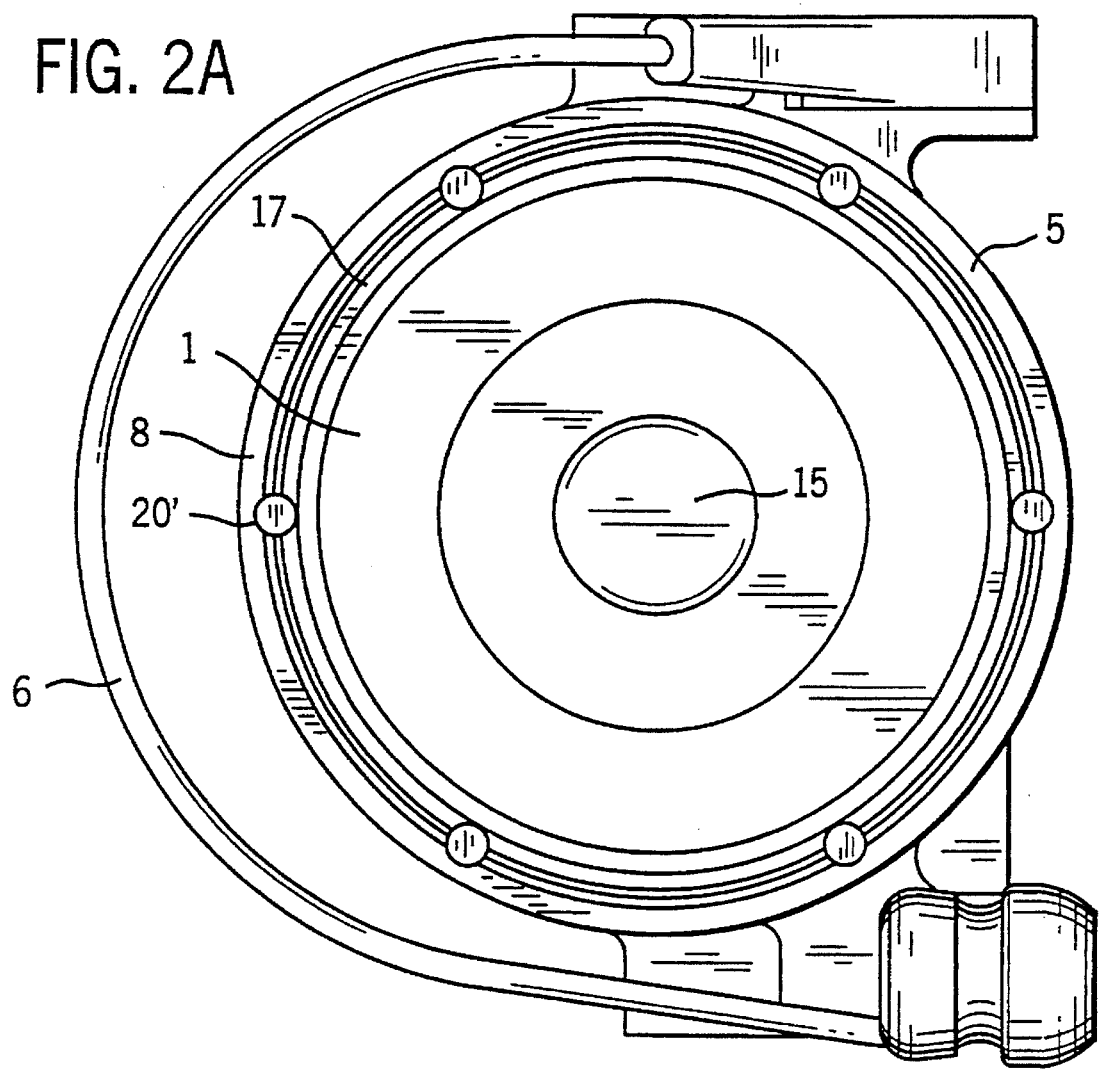

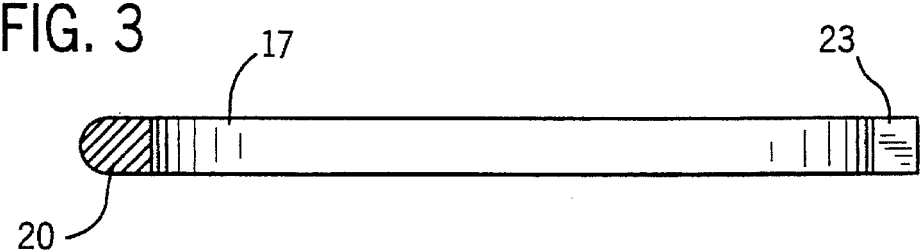
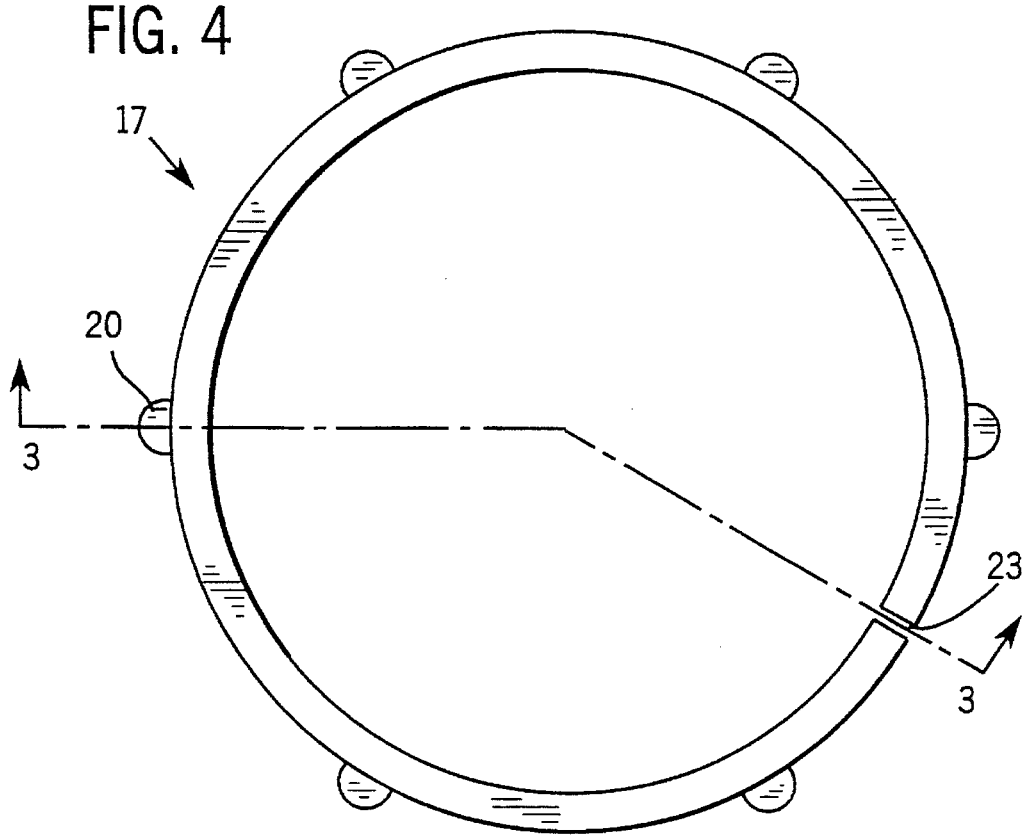
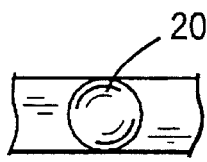

5,573,193

FISHING REEL WITH ENCLOSED SPOOL AND LINE RETAINING DEVICE

BACKGROUND OF THE INVENTION

1. Field of the Invention

The present invention concerns fishing reels of the type with a fixed spool and a line recovery device.

2. Description of the Prior Art

In this type of reel a spool is carried by a support shaft whose posterior part is held in a reel body. The spool is a part substantially in the shape of a solid of revolution made up of radially extending anterior and posterior flanges linked by a smaller diameter cylindrical hub extending axially between the flanges and forming a peripheral groove in which the fishing line is stowed. The spool support shaft is reciprocated longitudinally by a handle and a mechanical transmission device. A flyer carrying a retractable laying finger is mounted to rotate on the reel body and is rotated by the handle and the mechanical transmission device.

These reels with a fixed spool and a line recovery device include enclosed spool reels and enclosing spool reels.

In enclosed spool reels the spool slides in a hollow cylindrical housing in the flyer. The drawback of this old technology is the risk of the fishing line entering the space between the flyer and the posterior flange of the spool. If this happens the line can become wound at least partially around the spool support shaft behind the spool, which damages it and very seriously compromises the operation of the reel.

An enclosed spool reel is described in document FR-A-1 027 031. In this document the posterior flange of the spool comprises a peripheral annular groove in which is mounted a elastic steel ring whose outside diameter is greater than the diameter of the posterior flange. The outside peripheral surface of the ring is smooth, cylindrical and free of protrusions. The inside surface of the cylindrical side wall of the flyer is also cylindrical and smooth and free of longitudinal grooves. If the ring is presised against the wall of the flyer because of its elasticity, the resulting friction can compromise correct operation of the reel. On the other hand, if the ring is held away from the wall of the flyer because of its elasticity there is a circular gap between the ring and the wall of the recovery device. The line can enter this gap. For this reason the operation of a device of this kind is not satisfactory.

Document US-A-4 778 124 describes an enclosed spool reel having a more complex structure with rotary rollers and means for guiding rotation and longitudinal movement in translation of the rollers. This solution requires many additional components and significantly increases the overall size of the reel. Also, the rollers impede demounting of the spool.

Documents FR-A-918 571, US-A-2 643 828, US-A-2 973 916 and FR-A-861 383 describe other solutions in which flexible members such as disks, wires or brushes are accommodated in the Space between the posterior flange of the spool and the Cylindrical part of the flyer. All these solutions lead to friction between the spool and the flyer, varying with the axial position of the spool and impeding free rotation of the recovery device. The friction leads to non-negligible wear of the wires or brushes, which have to be replaced from time to time.

For these reasons the enclosed spool technology has been progressively abandoned in favor of the enclosing spool technology, whereby the spool comprises a rear flange with a skirt enclosing an inside cylindrical part of the flyer. The enclosing rear skirt reduces very significantly the risk of the fishing line getting between the flyer and the spool. However, a structure of this kind also reduces the usable diameter of the spool relative to the overall diameter of the reel and imposes greater mechanical loads on the line because of the smaller spool diameter.

The problem to which the present invention is addressed is that of designing a new fishing reel structure which has the advantages of greater compactness and smaller mechanical loads on the line combined with the use of an enclosed spool, great simplicity, a small number of components and easy demounting of the spool, and which effectively eliminates the risk of the line getting between the flyer and the posterior flange of the spool.

The problem is that a relatively large clearance is needed between the cylindrical peripheral wall of the flyer and the peripheral edge of the posterior flange of the spool. This clearance is particularly large in the case of a molded plastics material flyer, the inside surface of the peripheral wall of the flyer being necessarily conical and widening towards the exterior to facilitate removing it from the mold. The clearance between the peripheral wall of the recovery device and the peripheral edge of the posterior flange of the spool therefore varies with the longitudinal position of the spool relative to the reel body.

The invention is based on the observation that the risk of the fishing line entering the gap which is necessarily present between the spool and the recovery device results from the circular shape of this gap, which is similar to the shape which the line can assume if random movements occur during use of the reel. The present invention is directed to changing the shape of the gap or clearance between the spool and the flyer to form chicanes impeding entry of the line.

SUMMARY OF THE INVENTION

To achieve these and other objects, a fishing reel of the invention with a fixed spool and rotary line recovery device comprises a spool with a peripheral groove for stowing the line flanked by anterior and posterior flanges; the spool is carried by a support shaft whose posterior part is held in a reel body and is reciprocated longitudinally by a handle and a mechanical transmission device; a flyer carrying a retractable laying finger is rotatably mounted on the reel body and is rotated by the handle and the mechanical transmission device; the spool is at least partially enclosed by a cylindrical side wall of the flyer; the posterior flange comprises a peripheral annular groove; a ring is rotatably mounted in said peripheral annular groove; the outside diameter of the ring is greater than the outside diameter of the posterior flange and the outside peripheral surface of the ring slides with clearance in the cylindrical side wall of the flyer; the outside peripheral surface of the ring comprises studs engaged with clearance in longitudinal grooves on the inside surface of the cylindrical side wall of the flyer; the studs therefore form chicanes impeding penetration of the fishing line between the spool and the flyer.

It is preferable to provide at least two diametrically opposed studs on the outside peripheral surface of the ring.

The solution of the invention makes it easy to increase the number of line retaining points at no additional cost.

At least six equally spaced studs are preferably provided on the outside peripheral surface of the ring.

Other objects, features and advantages of the present invention emerge from the following description of specific

BRIEF DESCRIPTION OF THE DRAWINGS

FIG. 3 is a side view of the ring in cross-section on the line 3—3 in FIG. 4.

FIG. 4 is a front view of a ring of the invention.

FIG. 5 is a detail view showing the transverse cross-section of a ring stud.

DETAILED DESCRIPTION OF THE PREFERRED EMBODIMENTS

Figure 1:
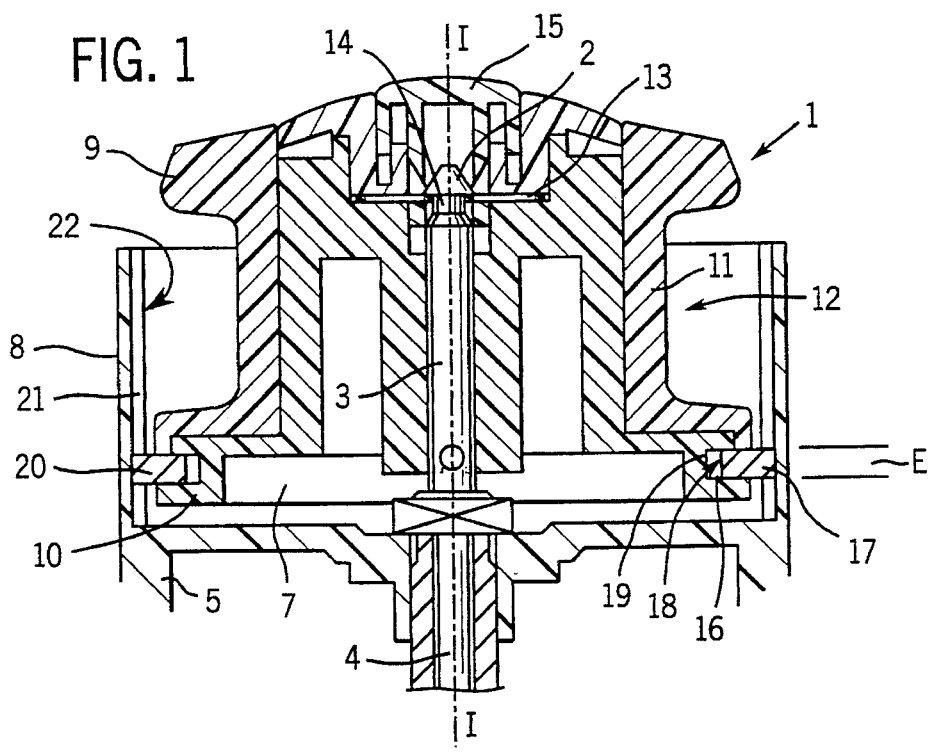
FIG. 1 is a side view in longitudinal cross-section of an anterior part of a reel of the invention.

Referring to the figures, the reel of the invention comprises a spool 1 fitted to the anterior end 2 of a support shaft 3 whose posterior part 4 is held in a reel body (not shown in the figures). The support shaft 3 is reciprocated longitudinally by a handle and a mechanical transmission device, for example, a prior art transmission device commonly used in fishing reels with a fixed spool and a line recovery device.

A flyer 5 carrying a retractable laying finger 6 is mounted to rotate on the reel body about the axis I—I of the support shaft 3 and is rotated about this axis by the handle and the mechanical transmission device of the reel.

The flyer 5 comprises a coaxial hollow cylindrical anterior housing 7 in which the spool 1 slides axially when reciprocated longitudinally. The spool 1 is therefore at least partially enclosed by a cylindrical side wall 8 of the flyer 5.

The spool 1 comprises an anterior flange 9 and a posterior flange 10 offset axially from each other and joined together by a smaller diameter cylindrical hub 11 to form a peripheral groove 12 for stowing the fishing line.

The spool 1 is removably mounted on the support shaft 3 and to this end comprises a locking mechanism including an elastic key 13 engaging in an annular groove 14 on the support shaft 3 and operated by a pushbutton 15.

The posterior flange 10 of the spool 1 comprises a peripheral annular groove 16. A ring 17 is rotatably mounted in this peripheral annular groove 16. The inside diameter of the ring, i.e. the diameter of its inside surface 18, is greater than the diameter of the bottom 19 of the groove 16 in which it is inserted, to leave a clearance enabling eccentricity of the ring 17 relative to the spool 1. The thickness E of the ring 17 is less than the width of the groove 16 to allow free movement of the ring 17 in the groove 16.

The outside peripheral surface of the ring 17 slides with clearance in the peripheral side wall 8 of the flyer 5.

The outside peripheral surface of the ring 17 comprises studs such as the stud 20 engaged with clearance in longitudinal grooves 21 on the inside surface 22 of the cylindrical side wall 8 of the flyer. The studs 20 and the groove 21 form chicanes preventing entry of the fishing line between the spool 1 and the flyer 5, despite the necessary existence of a clearance between these two members.

At least two diametrally opposed studs are preferably provided on the peripheral surface of the ring 17.

Better results are obtained with at least six equally spaced studs on the peripheral surface of the ring 17.

Increasing the number of studs and corresponding grooves reduces the risk of the line getting between the spool 1 and the flyer 5.

Figure 2:
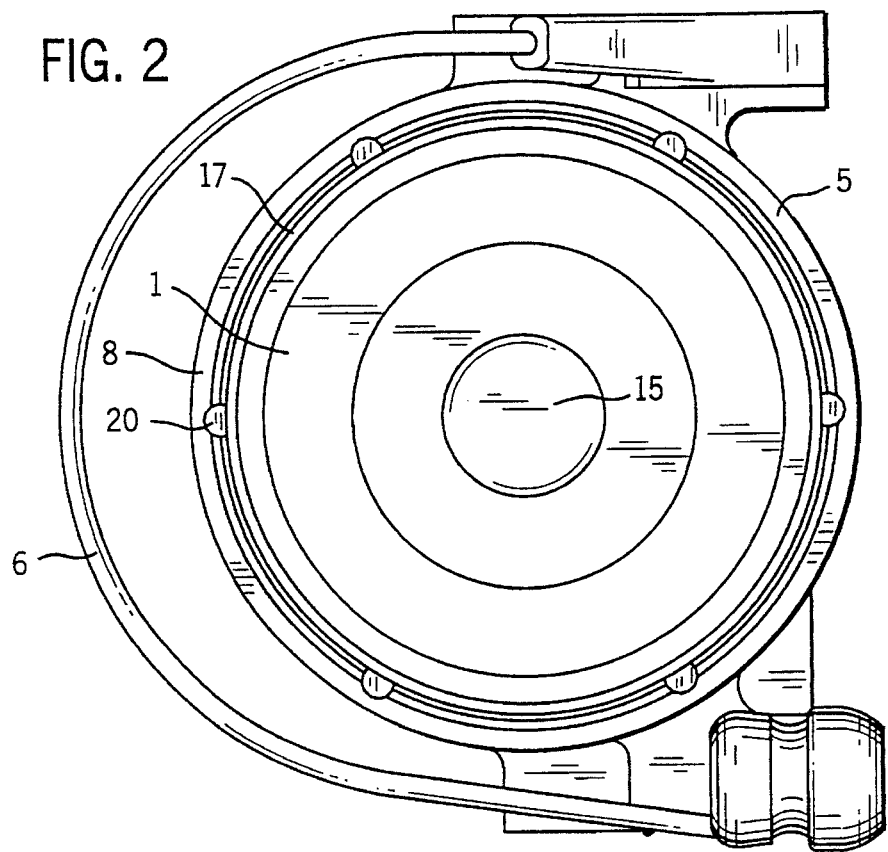
FIG. 2 is an end view of the reel from FIG. 1.

In an advantageous embodiment of the invention the lateral surfaces of the ring 17 comprise balls 20' adapted to bear on the respective lateral surfaces of the groove 16 was shown in FIG. 2A.

In the embodiment of the invention shown in FIGS. 3 to 5 the ring 17 is a split ring with a slot 23 and comprises six rounded top studs with a substantially circular cross-section, for example. In this case the studs can be made from a rigid or semi-rigid material such as a molded plastics material.

Alternatively, a continuous elastomer ring 17 can be used.

The present invention is not limited to the embodiments specifically described but encompasses various variants and generalizations thereof within the scope of the following claims.

What is claimed is:

1. A fishing reel comprising:

a spool having a peripheral groove for stowing a line flanked by anterior and posterior flanges, the spool being carried by a support shaft, said spool being reciprocated longitudinally, said spool having a peripheral annular groove;

a flyer carrying a retractable laying finger and including a cylindrical side wall radially surrounding said spool and longitudinally enclosing a portion of said spool, said flyer having a plurality of longitudinal grooves on an inside surface of the cylindrical side wall; and a ring having an outside diameter greater than the diameter of said posterior flange, said ring being rotatably mounted in said peripheral annular groove and including a plurality of protrusions extending radially therefrom, each of said protrusions extending with clearance into a corresponding longitudinal groove in said flyer, whereby said ring is free to rotate with respect to the spool when driven by engagement of the protusions in the longitudinal grooves and is free to reciprocate with the with resist to the flyer when driven by the spool by engagement of the ring in the peripheral annular groove to impede entry of line between said spool and said flyer.

2. A reel according to claim 1 wherein the protrusions include at least two studs on an outside peripheral surface of said ring.

3. A reel according to claim 1 wherein the protrusions include at least six equally spaced studs on an outside peripheral surface of said ring.

4. A reel according to claim 1 wherein an inside diameter of said ring is greater than an inside diameter of said peripheral annular groove thereby providing clearance enabling eccentricity of said ring relative to said spool, said ring having a thickness less than a width of said groove.

5. A reel according to claim 1 wherein a lateral surface of said ring comprises balls adapted to bear on a lateral surface of the respective groove.

6. A reel according to claim 1 wherein said ring is a split ring made from a rigid material.

7. A reel according to claim 1 wherein said ring is continuous and is made from an elastomeric material.

8. A reel according to claim 1 wherein said ring is a split ring made from a semi-rigid material.

9. A fishing reel comprising:

a spool having anterior and posterior flanges bordering a peripheral line storage groove, the posterior flange including a peripheral annular groove, the spool being supported on a central shaft for reciprocating movement along a longitudinal axis as line is wound into the storage groove;

a rotor at least partially surrounding the spool and supported for rotation with respect to the spool, the rotor having an inner peripheral wall extending generally parallel to the longitudinal axis, the inner peripheral wall being spaced from the posterior flange of the spool and having at least one longitudinal groove; and a ring-like line retainer lodged within the peripheral annular groove and freely rotatable therein with respect to the spool, the line retainer having at least one protrusion extending radially therefrom between the spool and the rotor inner peripheral wall, the at least one protrusion extending into the at least one longitudinal groove and freely slidable therein, whereby the line retainer is free to rotate with the rotor and free to reciprocate with the spool while preventing line from penetrating between the spool and rotor.

10. The fishing reel of claim 9, wherein the rotor completely surrounds the spool circumferentially.

11. The fishing reel of claim 9, wherein the line retainer is an elastomeric ring having a plurality of equally spaced protrusions.

12. The fishing reel of claim 9, wherein the line retainer has an outer diameter greater than an outer diameter of the posterior flange, the at least one protrusion extending radially beyond the outer diameter of the line retainer.

13. The fishing reel of claim 9, wherein the spool is removably mounted on a support shaft and includes a locking mechanism for securing the spool on the support shaft.

14. A fishing reel comprising:

a spool having anterior and posterior flanges bordering a peripheral line storage groove, the posterior flange including a peripheral annular groove, the spool being supported on a central shaft for reciprocating movement along a longitudinal axis as line is wound into the storage groove;

a rotor at least partially surrounding the spool and supported for rotation with respect to the spool, the rotor having an inner peripheral wall extending generally parallel to the longitudinal axis, the inner peripheral wall being spaced from the posterior flange of the spool and having at least one longitudinal first abutment surface; and a line retainer lodged within the peripheral annular groove and freely rotatable therein with respect to the spool, the line retainer having at least one second abutment surface extending radially therefrom between the spool and the rotor inner peripheral wall, the at least one second abutment surface contacting the at least one first abutment surface and freely slidable longitudinally thereon, whereby the line retainer is free to rotate with the rotor and free to reciprocate with the spool while preventing line from penetrating between the spool and rotor.

15. The fishing reel of claim 14, wherein the line retainer is a ring lodged rotatably within the peripheral annular groove.

16. The fishing reel of claim 14, wherein the first abutment surface is formed on a longitudinal groove and the second abutment surface is a protrusion extending from the line retainer into the longitudinal groove.

* * * * *